United States Patent
Han et al.

(10) Patent No.: US 8,281,103 B2
(45) Date of Patent: Oct. 2, 2012

(54) METHOD AND APPARATUS FOR ALLOCATING STORAGE ADDRESSES

(75) Inventors: Xinwei Han, Shenzhen (CN); Wan Lam, Shenzhen (CN); Naidong Ning, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 12/702,812

(22) Filed: Feb. 9, 2010

(65) Prior Publication Data

US 2010/0211755 A1    Aug. 19, 2010

(30) Foreign Application Priority Data

Feb. 13, 2009   (CN) .......................... 2009 1 0077490

(51) Int. Cl.
     *G06F 12/02*      (2006.01)
(52) U.S. Cl. ................. 711/170; 711/E12.006; 707/745
(58) Field of Classification Search .................... None
See application file for complete search history.

(56) References Cited

U.S. PATENT DOCUMENTS

| | | | |
|---|---|---|---|
| 5,784,699 A | | 7/1998 | McMahon et al. |
| 6,032,160 A | * | 2/2000 | Lehman ................................ 1/1 |
| 6,175,900 B1 | | 1/2001 | Forin et al. |
| 6,640,290 B1 | | 10/2003 | Forin et al. |
| 6,874,062 B1 | * | 3/2005 | Goldberg ....................... 711/117 |
| 6,937,611 B1 | * | 8/2005 | Ward .............................. 370/462 |
| 2003/0014583 A1 | * | 1/2003 | Burns et al. .................... 711/111 |
| 2007/0274303 A1 | | 11/2007 | Cui et al. |
| 2010/0125583 A1 | * | 5/2010 | Casper et al. ................. 707/745 |

FOREIGN PATENT DOCUMENTS

| | | |
|---|---|---|
| CN | 1819544 A | 8/2006 |
| EP | 0 350 713 A2 | 6/1989 |

OTHER PUBLICATIONS

Wilson et al. "Dynamic Storage Allocation: A Survey and Critical Review". 1995. Springer-Verlag. Lecture Notes in Computer Science. Issue 986/1995. pp. 1-116.*
Extended European Search Report in corresponding European Application No. 10153393.3 (May 10, 2010).

* cited by examiner

*Primary Examiner* — Charles Rones
*Assistant Examiner* — Nathan N Sadler
(74) *Attorney, Agent, or Firm* — Leydig, Voit & Mayer, Ltd.

(57) ABSTRACT

A method and apparatus for allocating storage addresses are disclosed. The method includes: receiving a storage address allocation request; searching a level-2 bitmap in a hierarchical bitmap in bidirectional mode; outputting an idle bit according to the result of searching in the level-2 bitmap; obtaining a storage address according to the output idle bit, and allocating the storage address. The apparatus includes: a first receiving module, configured to receive a storage address allocation request; a first searching module, configured to search a level-2 bitmap in a hierarchical bitmap in bidirectional mode for an idle bit, wherein the hierarchical bitmap includes N level-1 bitmaps and the level-2 bitmap; and an allocating module, configured to: obtain a storage address according to the output idle bit in the level-2 bitmap, and allocate the obtained storage address.

18 Claims, 7 Drawing Sheets

METHOD AND APPARATUS FOR ALLOCATING STORAGE ADDRESSES

CROSS-REFERENCE TO RELATED APPLICATION

This application claims priority to Chinese Patent Application No. 200910077490.4, filed Feb. 13, 2009, which is hereby incorporated by reference in its entirety.

TECHNICAL FIELD

The present invention relates to a communication technology, and in particular, to a method and apparatus for allocating storage addresses.

BACKGROUND

Buffer management is to manage the allocation and retrieval of external or embedded shared random access memory (RAM) resources of a chip. In particular, buffer management is extensively used in network devices and chips based on a store-and-forward data structure. Buffer management needs to ensure correctness of address allocation and retrieval and sufficient bandwidths for address allocation and retrieval. In present art, mature buffer management solutions include first-in first-out (FIFO) buffer management and bitmap buffer management.

In FIFO buffer management solution, the FIFO is used to store buffer addresses; all available buffer addresses are written to the FIFO at the time of initialization; addresses stored at the head of FIFO are read at the data receiving end and used to store received data; released addresses are written to the FIFO at the data transmitting end for address withdrawal. If the number of buffer addresses is n, then the quantity of consumed memory resources is calculated by the formula "$r=n*\log_2 n$" in units of bits.

The principle of bitmap buffer management is to map a buffer address to a bit in a bitmap of a certain width (for example, 512 bits or 1 Kbit); idle bits are searched out for allocating idle buffer addresses. When there is a large quantity of buffer units, the bitmap buffer management solution is faced with a problem about how to search for idle bits quickly. An improved solution is to combine the bitmap and FIFO management solution. That is, when data is received, a bitmap index is firstly read from the FIFO; a bitmap is found according to the bitmap index; and idle addresses in the bitmap are allocated by a decoding logic circuit. At the data transmitting end, released physical addresses are decoded into bitmap information and written to the RAM; if all bits in a bitmap in the RAM are released completely, the index information corresponding to the bitmap is written back to the FIFO, and thus the addresses are retrieved. In the "bitmap plus FIFO" buffer management solution, if the total number of buffer addresses is "$n=x*y$", the quantity of consumed resources is calculated by the formula "$r=n+y*\log_2 y$" in units of bit, where: "n" indicates the total number of RAM resources; "x" indicates the width of the bitmap; and "$y*\log_2 y$" indicates the number of FIFO resources.

SUMMARY

Embodiments of the present disclosure provide a method and apparatus for allocating storage addresses.

A method for allocating storage addresses in an embodiment of the present disclosure includes: (1) receiving a storage address allocation request; (2) searching a level-2 bitmap in a hierarchical bitmap in bidirectional mode, where: the hierarchical bitmap includes N level-1 bitmaps and the level-2 bitmap, and each level-1 bitmap includes M bits, and each bit of the level-1 bitmap corresponds to a storage address and indicates the idle state of the corresponding storage address; the level-2 bitmap includes N bits corresponding to the N level-1 bitmaps, and each bit of the level-2 bitmap indicates whether the corresponding level-1 bitmap has an idle storage address, where M and N are integers greater than 1; (3) outputting an idle bit according to the result of searching in the level-2 bitmap; and (4) obtaining a storage address corresponding to the output idle bit of the level-2 bitmap, and allocating the obtained storage address.

An apparatus for allocating storage addresses in an embodiment of the present disclosure includes: (1) a first receiving module, configured to receive a storage address allocation request; (2) a hierarchical bitmap, including N level-1 bitmaps and a level-2 bitmap, where: each level-1 bitmap includes M bits, and each bit of the level-1 bitmap corresponds to a storage address and indicates the idle state of the corresponding storage address; the level-2 bitmap includes N bits corresponding to the N level-1 bitmaps, and each bit of the level-2 bitmap indicates whether the corresponding level-1 bitmap has an idle storage address, where M and N are integers greater than 1; (3) a first searching module, configured to search the level-2 bitmap in the hierarchical bitmap in bidirectional mode to obtain an idle bit; and (4) an allocating module, configured to: obtain a storage address corresponding to the output idle bit of the level-2 bitmap, and allocate the obtained storage address.

BRIEF DESCRIPTION OF THE DRAWINGS

To make the technical solution under the present disclosure or in the conventional art clearer, the accompanying drawings for illustrating the embodiments of the present disclosure or illustrating the conventional art are outlined below. Evidently, the accompanying drawings are exemplary only, and those skilled in the art can derive other drawings from such accompanying drawings without creative work.

DETAILED DESCRIPTION

The technical solution of the present disclosure is hereinafter described in detail with reference to the accompanying drawings. It is evident that the embodiments are only exemplary embodiments of the present disclosure and the present disclosure is not limited to such embodiments. Other embodiments that those skilled in the art obtain without creative work based on embodiments of the present disclosure also fall in the scope of protection of the present disclosure.

Figure 1:
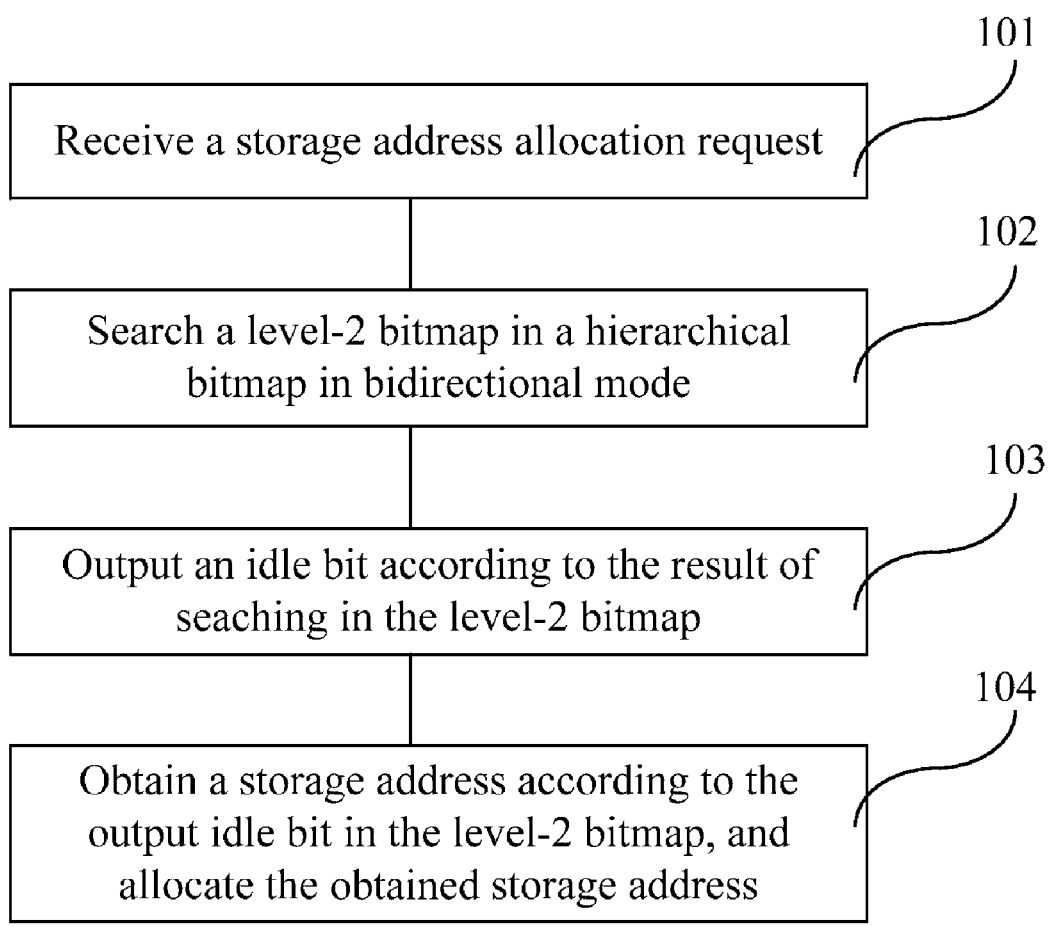
FIG. 1 is a flowchart of a method for allocating storage addresses in an embodiment of the present disclosure.

A storage address management solution based on a hierarchical bitmap in an embodiment of the present disclosure includes a method and apparatus for allocating storage addresses. FIG. 1 is a flowchart of a method for allocating storage addresses in an embodiment of the present disclosure. As shown in FIG. 1, the method includes the following steps.

Step 101: Receive a storage address allocation request.

Step 102: Search a level-2 bitmap in a hierarchical bitmap in bidirectional mode, where: the hierarchical bitmap includes N level-1 bitmaps and the level-2 bitmap, and each level-1 bitmap includes M bits, and each bit of level-1 bitmap corresponds to a storage address and indicates the idle state of the corresponding storage address; the level-2 bitmap includes N bits corresponding to the N level-1 bitmaps, and each bit of the level-2 bitmap indicates whether the corresponding level-1 bitmap has an idle storage address, where M and N are integers greater than 1.

Step 103: Output an idle bit according to the result of searching in the level-2 bitmap.

Step 104: Obtain a storage address corresponding to the output idle bit of the level-2 bitmap, and allocate the obtained storage address.

In this embodiment, after receiving a storage address allocation request, the apparatus for allocating storage addresses searches the level-2 bitmap in bidirectional mode to obtain a storage address, thus improving the efficiency of storage address allocation. In addition, the method for allocating storage addresses in this embodiment may be applicable to allocation of storage addresses in a buffer, a memory and a hard disk.

In this embodiment, each bit of a level-1 bitmap corresponds to a storage address. If a bit is set to 1, it may indicate that the storage address corresponding to the bit is in the occupied state. If a bit is set to 0, it may indicate that the storage address corresponding to the bit is in the idle state; that is, the bit is an idle bit. In the level-2 bitmap, each bit is set for each level-1 bitmap to store idle address information of each level-1 bitmap. The idle address information may be the bit in the lever-2 bitmap serving as a data identifier ("0" or "1") indicating whether there is an idle bit in the corresponding level-1 bitmap. A storage unit may also be set to correspond to each bit of the level-2 bitmap and to store a storage address corresponding to the idle bit.

In this embodiment, the storage address may be a buffer address, a memory address or a storage address in a hard disk. The following describes the technical solution provided in embodiments of the present disclosure by taking the allocation and management of buffer addresses as an example. For example, if a buffer system has a total of 1,024 buffer addresses, then 16 level-1 bitmap buffer partitions may be set. Each level-1 bitmap buffer may include 64 bits, while the level-2 bitmap may include 16 bits, and each level-2 bitmap corresponds to a level-1 bitmap.

In this embodiment, a hierarchical bitmap is used, and a level-1 bitmap is searched in bidirectional mode to obtain idle address information; the search result is stored in the level-2 bitmap. Specifically, if the result of searching indicates that the level-1 bitmap has an idle bit, an idle bit is output according to the result of searching; the storage address corresponding to the idle bit is recorded; and the corresponding bit in the level-2 bitmap is updated to an idle bit; or, if the result of searching indicates that the level-1 bitmap does not have an idle bit, the corresponding bit in the level-2 bitmap is updated to an occupied bit. After a buffer address allocation request is received, a buffer address is allocated according to the preceding idle address information. If a storage unit is set for each bit in the level-2 bitmap, the idle buffer address may be obtained from the storage unit corresponding to each bit of the level-2 bitmap. Otherwise, the storage address may be obtained by calculation according to the position of the idle bit in the level-2 bitmap and the position of the idle bit in the corresponding level-1 bitmap, where the position of the idle bit is represented in binary notation. For example, if a search result in the level-2 bitmap is "bit 2=1" and the search result in the level-1 bitmap is "bit 254=1", then the idle buffer address may be "0010111110", where the first four bits "0010" indicate bit "2" in the level-2 bitmap, and the last six bits "111110" indicate bit "254" in the level-1 bitmap. The method for allocating buffer addresses in this embodiment can improve the efficiency of the buffer allocation and reduce the consumption of system resources.

Figure 2:
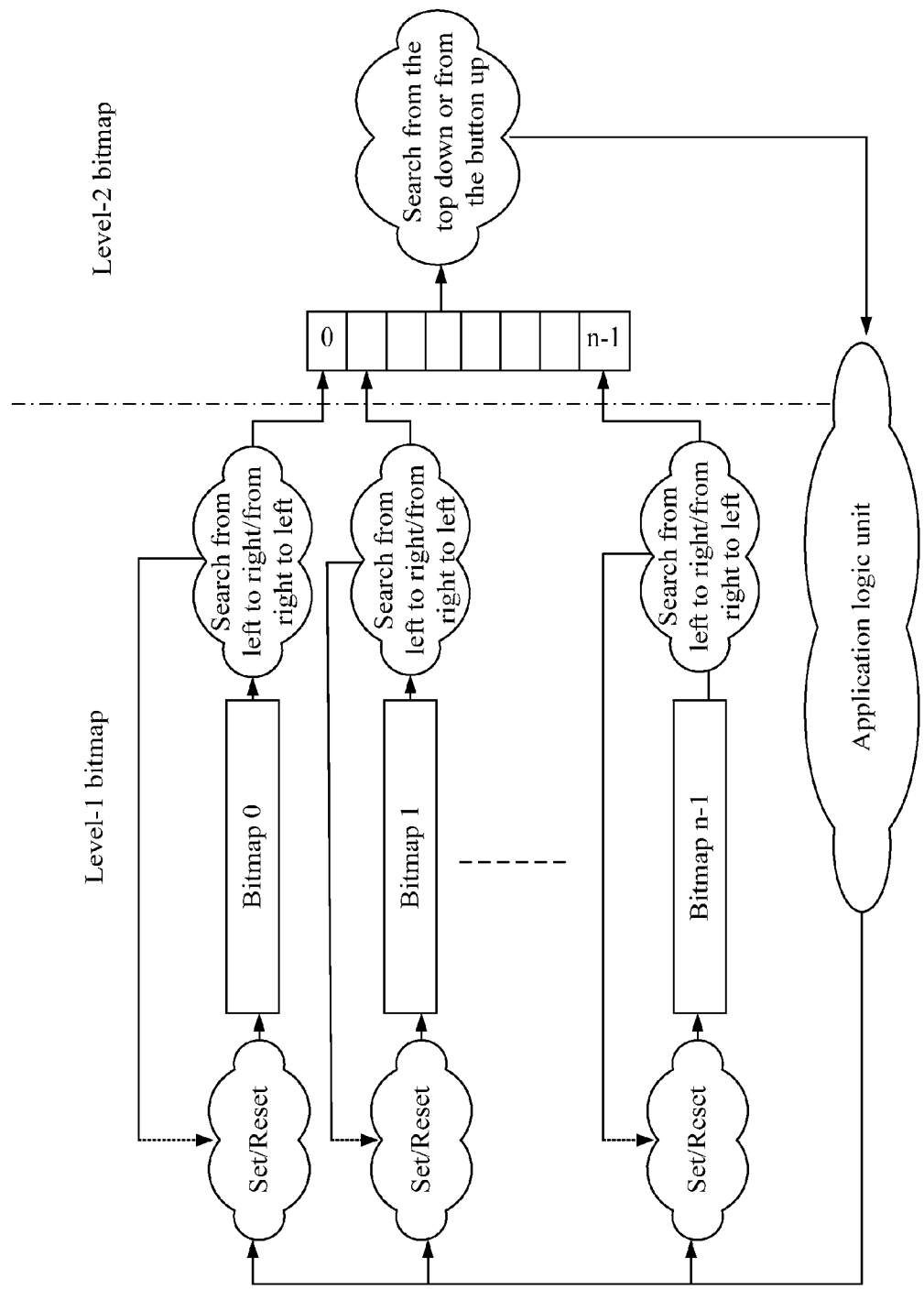
FIG. 2 shows a buffer management structure in a hierarchical bitmap in an embodiment of the present disclosure.

FIG. 2 shows a buffer management structure in a hierarchical bitmap in an embodiment of the present disclosure. As shown in FIG. 2, the hierarchical bitmap includes level-1 bitmaps and a level-2 bitmap. The level-1 bitmaps are represented by Bitmap 0, Bitmap 1, . . . , Bitmap n-1, and the level-2 bitmap includes n bits, and each bit of the level-2 bitmap corresponds to a level-1 bitmap and is used to store the idle state information of the buffer address of the corresponding level-1 bitmap. Suppose "1" indicates an idle bit, indicating that the corresponding buffer address is idle, and suppose "0" indicates an occupied bit, indicating that the corresponding buffer address is already occupied and cannot be allocated. If Bitmap 3 has an idle bit, the value of bit 3 in the level-2 bitmap is 1. When buffer addresses are allocated and released, an application logic unit triggers the search of idle bits in the level-1 bitmaps. In addition, a time period may also be set, so that the search of idle bits is triggered when the time period expires. Bits in the level-1 bitmaps need to be set or reset each time after the buffer addresses are allocated and released. The level-1 bitmaps may be searched in bidirectional mode, that is "from left to right" and "from right to left" at the same time. The level-1 bitmaps may be searched only in one direction at each time so long as the successive two times of searches are performed in different directions, as shown in FIG. 2. During the actual implementation, the following cases may be involved:

a. The search of idle bits is performed in the directions of "from left to right" and "from right to left" respectively. If idle bits are found in both directions, an idle bit is selected according to the polling principle. That is, if an idle bit found in the direction of "from left to right" is selected as the result of searching in the previous search, then an idle bit found in the direction of "from right to left" is selected as the result of searching in the current search. Similarly, if an idle bit found in the direction of "from right to left" is selected as the result of searching in the previous search, then an idle bit found in the direction of "from left to right" is selected as the result of searching in the current search. In addition, the first idle bit found in each direction is selected as the search result of the current search. Besides, an idle bit may be searched in only one direction in each search according to the polling principle. That is, if the previous search is performed from right to left, then the current search is performed from left to right, and the result of the each search is used as the result of searching.

b. If the search is performed from left to right and from right to left at a time, and only one idle bit is found when the distance between the two search pointers is zero. In this case, the only one idle bit is output as the result of searching.

c. If no idle bit is found, "0" is output and written to a corresponding bit in the level-2 bitmap.

If an idle bit is found in the preceding two cases "a" or "b", "1" may be written to a corresponding bit in the level-2 bitmap, indicating that the buffer partition has an idle bit. In addition, the buffer address corresponding to the preceding found idle bit may be written to a storage unit corresponding to the idle bit in the level-2 bitmap. In this case, during the subsequent allocation of buffer addresses, the buffer address may be obtained directly from the storage unit corresponding to the idle bit in the level-2 bitmap, without calculating the buffer address.

The value of the level-2 bitmap is based on the search result in the level-1 bitmaps. Each bit of the level-2 bitmap corresponds to a level-1 bitmap. If an idle bit is found in the level-1 bitmaps, the level-2 bitmap needs to be updated. The level-2 bitmap is searched in bidirectional mode during the buffer allocation. The specific implementation process may involve the following cases:

a. When more than one level-1 bitmaps have idle bits, the idle bits are allocated according to the polling principle, as shown in FIG. 2. That is, if the buffer addresses are selected by search in the top-down direction last time, the buffer addresses are selected by search in the bottom-up direction this time; if the buffer addresses are selected by search in the bottom-up direction last time, the buffer addresses are selected by search in the top-down direction this time.

b. When only one level-1 bitmap has an idle bit, the buffer address corresponding to the idle bit of the level-1 bitmap is selected. If a storage unit that stores buffer addresses is set in the level-2 bitmap, the buffer addresses may be read directly. If the bit in the level-2 bitmap stores only a data identifier that indicates whether an idle bit is available, the buffer addresses may be obtained through a simple logical calculation according to the position of the idle bit in the level-1 bitmap and the position of the idle bit in the level-2 bitmap.

The preceding processes of searching the level-1 bitmaps for idle bits and searching the level-2 bitmap for idle bits may be completed within a logical clock period respectively.

In addition, during the process of searching the level-1 bitmaps for idle bits, the level-1 bitmaps may not be updated immediately after an idle bit is found in the level-1 bitmaps because the search result in the level-2 bitmap needs to be obtained. After the level-2 bitmap is searched, it is determined whether the allocated buffer address corresponding to the idle bit is the buffer address corresponding to the bit found in the level-1 bitmaps. That is, the level-1 bitmaps are updated once in every two logical clock periods. If the buffer address allocated after the level-2 bitmap is searched corresponds to the idle bit found in the preceding level-1 bitmaps, the bit corresponding to the buffer address in the level-1 bitmaps is set to the occupied state, that is, the non-idle state. Then the update process of level-1 bitmap ends. Otherwise this bit is still kept in the idle state, and is not updated. The update period of the level-2 bitmap may also be equivalent to two logical clock periods. The meaning of the equivalence is as follows. In principle, each logical clock period of the level-2 bitmap is always updated, but the updated value is based on the search result in the level-1 bitmaps. The level-1 bitmaps are updated once every two logical clock periods, so the level-2 bitmap is actually updated once in every two clock periods. The update period of the level-2 bitmap depends on the search result in the level-1 bitmaps. This may involve the following two cases: (1) when the remaining number of idle bits in the bitmaps is greater than 1; (2) when the remaining number of idle bits in the bitmaps is equal to 1. In the first case, by the bidirectional search mode, the latest bit information may always be obtained in the level-2 bitmap during each clock period, and the bitmap can be timely updated in each clock period. In the second case, because only one bit is left, a same bit may be searched out during the two consecutive clock periods even by using the bidirectional search. That is, in this special case, it needs two clock periods for updating the value of the level-2 bitmap.

Figure 3:
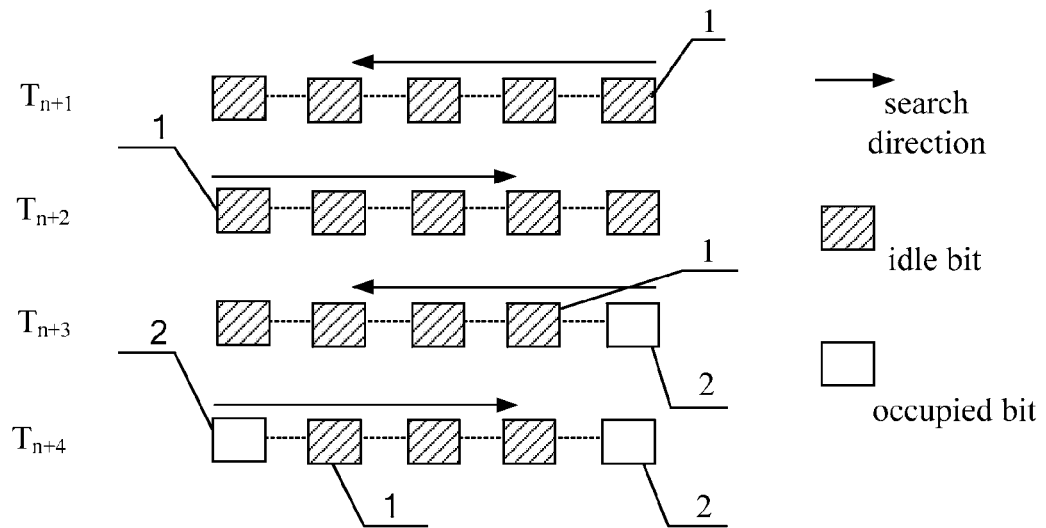
FIG. 3 is a schematic diagram illustrating allocation of buffer addresses according to a polling principle in an embodiment of the present disclosure.
Figure 4:
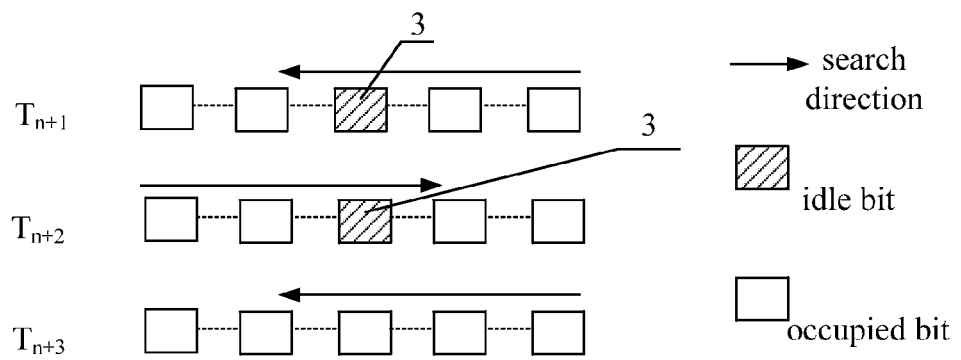
FIG. 4 is a schematic diagram illustrating repeated allocation of buffer addresses shown in FIG. 3.

If buffer addresses allocation is performed successively, the process of searching the bitmaps is also successive. To avoid repeated allocation of buffer addresses (that is, a same idle bit is searched out in the bitmap during two consecutive logical clock periods) due to late updating of bitmaps, the polling principle may be used to select an idle bit as the result of searching. As shown in the top-down direction of FIG. 3, $T_{n+1}$, $T_{n+2}$, $T_{n+3}$ and $T_{n+4}$ indicate the time moment of searching a level-1 bitmap, wherein "1" indicates a selected idle bit and "2" indicates an occupied buffer address. As shown in FIG. 3, at $T_{n+1}$ moment, the search is performed from right to left, and an idle bit at the rightmost position is selected; at $T_{n+2}$ moment, the state of the buffer address is not updated; if the search is continued from right to left, the idle bit will be reselected. In this embodiment, the search is performed from left to right at $T_{n+2}$ moment, and an idle bit at the leftmost position is selected; at $T_{n+3}$ moment, the selected idle address that is located at the rightmost position is already updated; and the search is continued from right to left; at $T_{n+4}$ moment, the search is continued from left to right. The arrows shown in FIG. 3 indicate search directions. This polling principle can ensure that the buffer addresses are not allocated repeatedly. When only one idle buffer address is available in the buffer space, that is, when only one idle bit is left in the level-1 bitmaps, the buffer address may be allocated repeatedly. As shown in the top-down direction of FIG. 4, the level-1 bitmaps are searched at $T_{n+1}$, $T_{n+2}$ and $T_{n+3}$ moment. At $T_{n+1}$ moment, only one idle bit is available in the buffer. "3" is used to indicate that the idle bit is selected. At $T_{n+2}$ moment, the idle bit is not updated, so it is reselected. In this case, a judgment mechanism may be set at the egress to judge whether the buffer addresses searched out during the two successive searches are the same; if yes, the buffer address searched out at the second time may be discarded. So the idle bit is updated to be occupied at $T_{n+3}$ moment. In addition, each level-1 bitmap or the whole buffer space may be set to reserve several idle addresses. When the whole buffer space is set to reserve several idle addresses, an idle address counter may be set and initialized. The initial value is equal to the number of idle addresses in the current storage space. After a storage address is allocated, the value of the counter is reduced by "1"; after a storage address is released, the value of the counter is increased by "1." And real-time judgment is made to judge whether the value of the counter is smaller than a preset threshold or not; if the value of the counter is smaller than the preset threshold, the operation of storage address allocation is canceled.

The preceding polling principle is also applicable to the search in the level-2 bitmap. In the buffer management technical solution provided in this embodiment of the present disclosure, the bidirectional search method applied to the level-1 bitmaps and the level-2 bitmap can ensure that the search directions of the level-1 bitmaps and the level-2 bitmap are updated before the value of the level-1 bitmaps and the level is updated, thus avoiding idle bits that are not timely updated.

Figure 5:
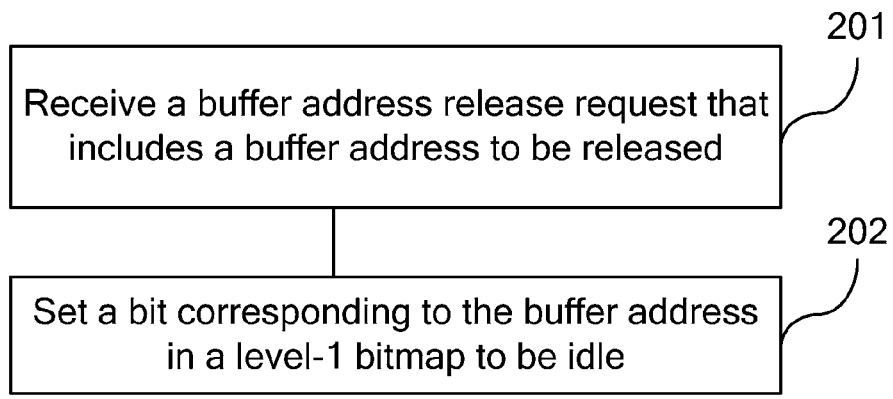
FIG. 5 is a flowchart of retrieving buffer addresses in an embodiment of the present disclosure.

The buffer management solution provided in this embodiment may also be used in the process of retrieving buffer addresses. FIG. 5 shows a process of retrieving buffer addresses in an embodiment of the present disclosure. As shown in FIG. 5, the process includes the following steps.

Step 201: Receive a buffer address release request that carries a buffer address to be released. In this step, after receiving the buffer address release request that carries a buffer address to be released, a level-1 bitmap to which the buffer address belongs is located, and a bit that represents the buffer address is located.

Step 202: Set a bit corresponding to the buffer address in the level-1 bitmap to be idle. After the buffer address is located, the bit may be set to be idle to indicate that the buffer address corresponding to the bit is already an idle address and can be allocated. The preceding process of retrieving buffer addresses may be regarded as a decoding process.

After the buffer addresses are retrieved, the state of buffer addresses are updated, and updating of idle address information may be triggered again. Idle bits are searched out in each buffer partition in the level-1 bitmaps according to the preceding polling principle, and the search result is stored as the idle address information in a corresponding bit in the level-2 bitmap. Thus, the idle address information is updated. In this embodiment, the search in the level-1 bitmaps is triggered after the buffer addresses are retrieved, which ensures that the buffer information in the hierarchical bitmap can be timely updated.

It is understandable to those skilled in the art that all or part of the processes in the preceding method may be completed by hardware instructed by a computer program. The program may be stored in a computer readable storage medium. During the execution of the program, the processes of the preceding embodiments may be involved. The storage medium may be a magnetic disk, a compact disk (CD), a read-only memory (ROM) or a random access memory (RAM).

Figure 6:
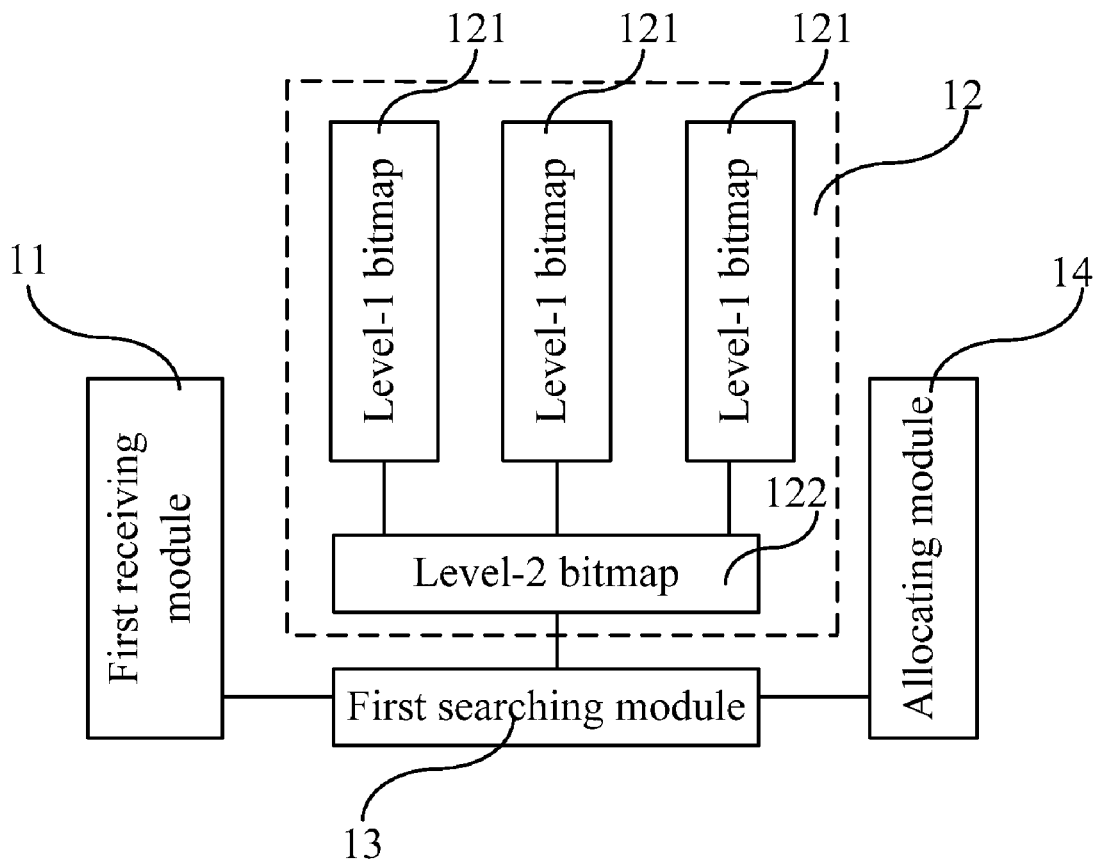
FIG. 6 shows a structure of an apparatus for allocating storage addresses in a first embodiment of the present disclosure.

FIG. 6 shows a structure of an apparatus for allocating storage addresses in the first apparatus embodiment of the present disclosure. As shown in FIG. 6, the apparatus includes a first receiving module 11, a hierarchical bitmap 12, a first searching module 13 and an allocating module 14. The first receiving module 11 is configured to receive a storage address allocation request. The hierarchical bitmap 12 includes N level-1 bitmaps 121 and a level-2 bitmap 122; each level-1 bitmap includes M bits, and each bit of the level-1 bitmap corresponds to a storage address and indicates the idle state of the corresponding storage address; the level-2 bitmap includes N bits corresponding to the N level-1 bitmaps, and each bit of the level-2 bitmap indicates whether the level-1 bitmaps have idle storage addresses, where M and N are integers greater than 1. The first searching module 13 is configured to search the level-2 bitmap in the hierarchical bitmap in bidirectional mode to obtain an idle bit. The allocating module 14 is configured to: obtain a storage address corresponding to the output idle bit in the level-2 bitmap, and allocate the obtained storage address.

After receiving a storage address allocation request, the apparatus for allocating storage addresses in this embodiment searches the level-2 bitmap in bidirectional mode to obtain an idle bit and a storage address corresponding to the idle bit, thus improving the efficiency of the storage address allocation and management and reducing the consumption of system resources.

Figure 7:
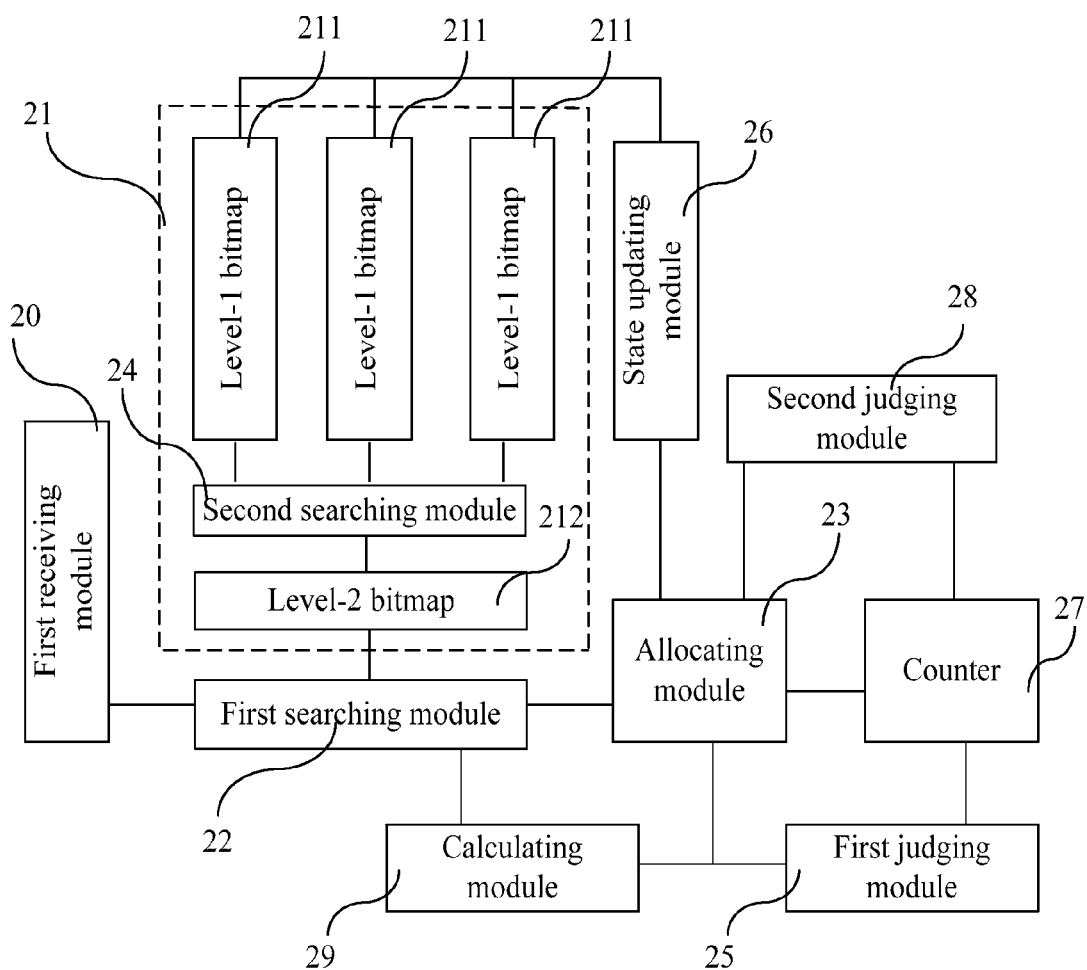
FIG. 7 shows a structure of an apparatus for allocating storage addresses in a second embodiment of the present disclosure.

FIG. 7 shows a structure of an apparatus for allocating storage addresses in the second apparatus embodiment of the present disclosure. As shown in FIG. 7, the apparatus includes a first receiving module 20, a hierarchical bitmap 21, a first searching module 22 and an allocating module 23. The first receiving module 20 is configured to receive a storage address allocation request. The hierarchical bitmap 21 includes N level-1 bitmaps 211 and a level-2 bitmap 212; each level-1 bitmap includes M bits, each of which corresponds to a storage address and indicates the idle state of the corresponding storage address; the level-2 bitmap includes N bits corresponding to the N level-1 bitmaps, and each bit of the level-2 bitmap indicates whether the level-1 bitmaps have idle storage addresses, where M and N are integers greater than 1. The first searching module 22 is configured to search the level-2 bitmap in the hierarchical bitmap in bidirectional mode to obtain an idle bit. The allocating module 23 is configured to: obtain a storage address corresponding to the output idle bit in the level-2 bitmap, and allocate the obtained storage address. The apparatus may further include a second searching module 24, a first judging module 25, a state updating module 26, a counter 27 or a second judging module 28.

The second searching module 24 is configured to: search each level-1 bitmap in bidirectional mode, and update corresponding bits in the level-2 bitmap according to the bidirectional search in the level-1 bitmaps. In this embodiment, the level-1 bitmaps are searched in bidirectional mode to obtain idle bits, which can improve the efficiency of updating the level-2 bitmap.

The first judging module 25 is connected to the allocating module 23, and is configured to: judge whether the storage address obtained according to the output idle bit of the current search is the same as the storage address obtained according to the output idle bit of the previous search in the level-2 bitmap or not; and if the storage address obtained according to the output idle bit of the current search is the same as the storage address obtained according to the output idle bit of the previous search in the level-2 bitmap, cancel the operation of storage address allocation at the current time. The technical solution provided in this embodiment can ensure that a same storage address is not allocated repeatedly, thus improving the accuracy of storage address allocation.

The state updating module 26 is configured to: update the bits corresponding to the allocated storage addresses in the level-1 bitmaps to occupied bits after storage addresses are allocated; or update the bits corresponding to the storage addresses carried in the storage address release request in the level-1 bitmaps to idle bits after a storage address release request is received. The state updating module is connected to the allocating module, and can update the idle bits in the level-1 bitmaps immediately after the storage addresses are allocated. In this embodiment, the method for retrieving storage addresses is used for retrieving buffer addresses, and bit information in multiple level-1 bitmaps may be updated at a time, and the bandwidths for reading from and writing to buffer will not be limited as by the FIFO and "BITMAP+FIFO" solutions, which improves the efficiency and capability of retrieving buffer addresses.

A counter 27 is configured in the apparatus for allocating storage addresses in this embodiment. The counter is configured to store the total number of idle addresses in the current storage space. The value of the counter is reduced by 1 after a storage address is allocated; or the value of the counter is increased by 1 after a storage address is released. A second judging module 28 may also be configured. The second judging module is configured to: judge whether the value of the counter is smaller than a preset threshold or not; and if the value of the counter is smaller than a preset threshold, cancel the operation of the storage address allocation.

A calculating module 29 may be set for obtaining storage addresses according to idle bits. The calculating module is configured to: obtain a storage address by calculating according to the position of an idle bit in the level-2 bitmap and the position of an idle bit in a level-1 bitmap. In addition, a storage unit corresponding to bits in the level-2 bitmap may also be configured to store storage addresses corresponding to idle bits in the level-2 bitmap.

By using a hierarchical bitmap, the storage address management apparatus provided in this embodiment may search each level-1 bitmap for available idle bits when allocating storage addresses and writes the obtained idle address information to the level-2 bitmap; after receiving a storage address allocation request, the storage address management apparatus searches the level-2 bitmap in bidirectional mode to allocate a storage address; after receiving a storage address release request, the storage address management apparatus locates the position of a bit corresponding to the storage address to be released in the level-1 bitmaps, and updates the state of the bit. Then, the buffer address may be released and reallocated. The storage address management solution provided in this embodiment may control hardware resources effectively and improve the efficiency of storage address management.

Figure 8:
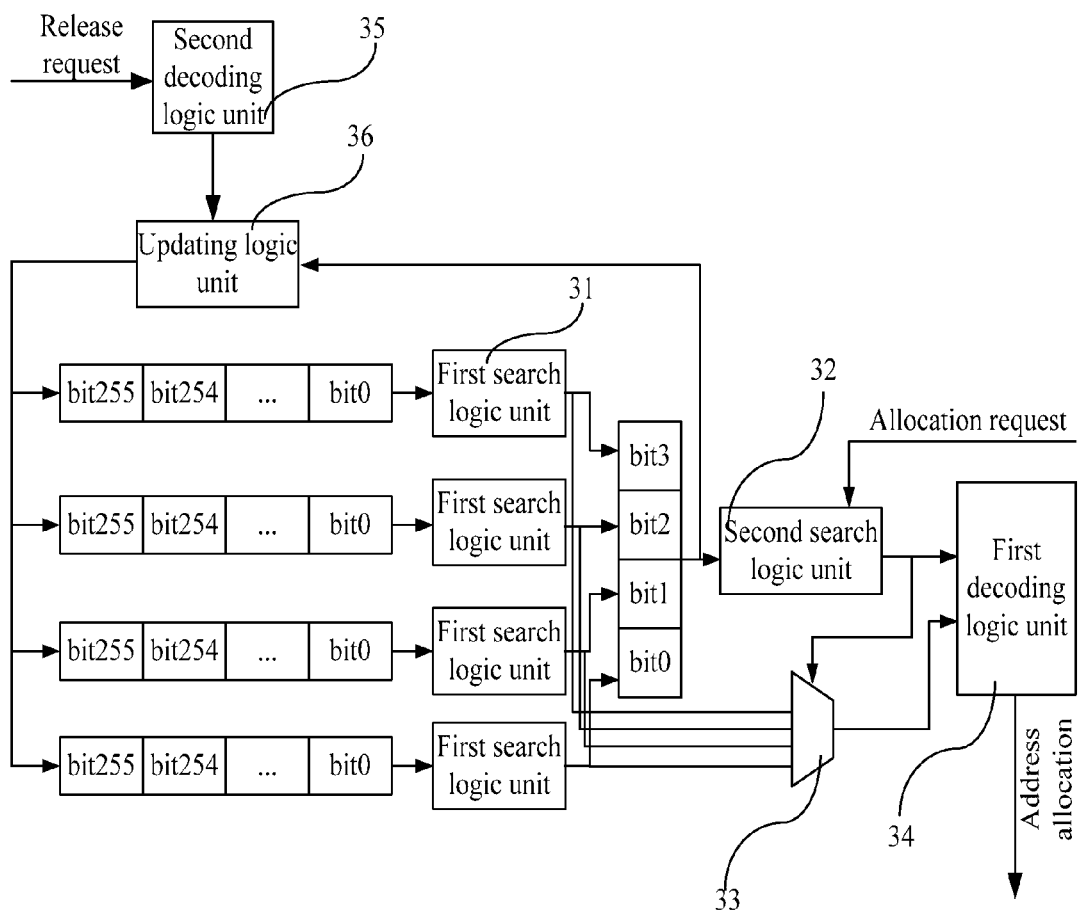
FIG. 8 is a schematic diagram of a storage address management solution in an embodiment of the present disclosure.

FIG. 8 shows a schematic diagram of a storage address management solution provided in an embodiment of the present disclosure. As shown in FIG. 8, this embodiment takes buffer address management as an example. The buffer space includes 1,024 addresses and is divided into 4 buffer partitions represented by four level-1 bitmaps, each of which manages 256 address units. The level-2 bitmap has four bits that correspond to four level-1 bitmaps respectively. Each level-1 bitmap corresponds to a first search logic unit 31, which searches for idle bits in bidirectional mode, and sends the search result to the level-2 bitmap. A second search logic unit 32 receives a buffer address allocation request and searches the level-2 bitmap in bidirectional mode for idle address information. The bit in the level-2 bitmap stores a data identifier of "1" or "0", which indicates whether there is an idle buffer address in the corresponding buffer partition. In addition, a storage unit may also be configured to store idle buffer addresses that are searched out in each level-1 bitmap. A multiplexer (Mux) 33 obtains idle buffer addresses through calculation, and then a first decoding logic unit 34 allocates the buffer addresses. Take an example, the Mux 33 may perform the calculation as follows. If the search result in the level-2 bitmap is "bit 2=1" and the search result in a corresponding buffer partition in a level-1 bitmap is "bit 254=1", then the buffer address obtained as "0010111110", where the first four bits indicate bit "2" in the level-2 bitmap and the last six bits indicate bit "254" in the level-1 bitmap. If the buffer addresses searched out in the level-2 bitmap are stored in the corresponding storage units, then the buffer addresses can be directly obtained from the storage units for allocation without a need of calculation. In addition, a buffer release request that includes buffer addresses is received by a second decoding logic unit 35. An updating logic unit 36 locates the released buffer addresses in the level-1 bitmaps, and updates bits corresponding to the released buffer addresses to idle bits.

Figure 9:
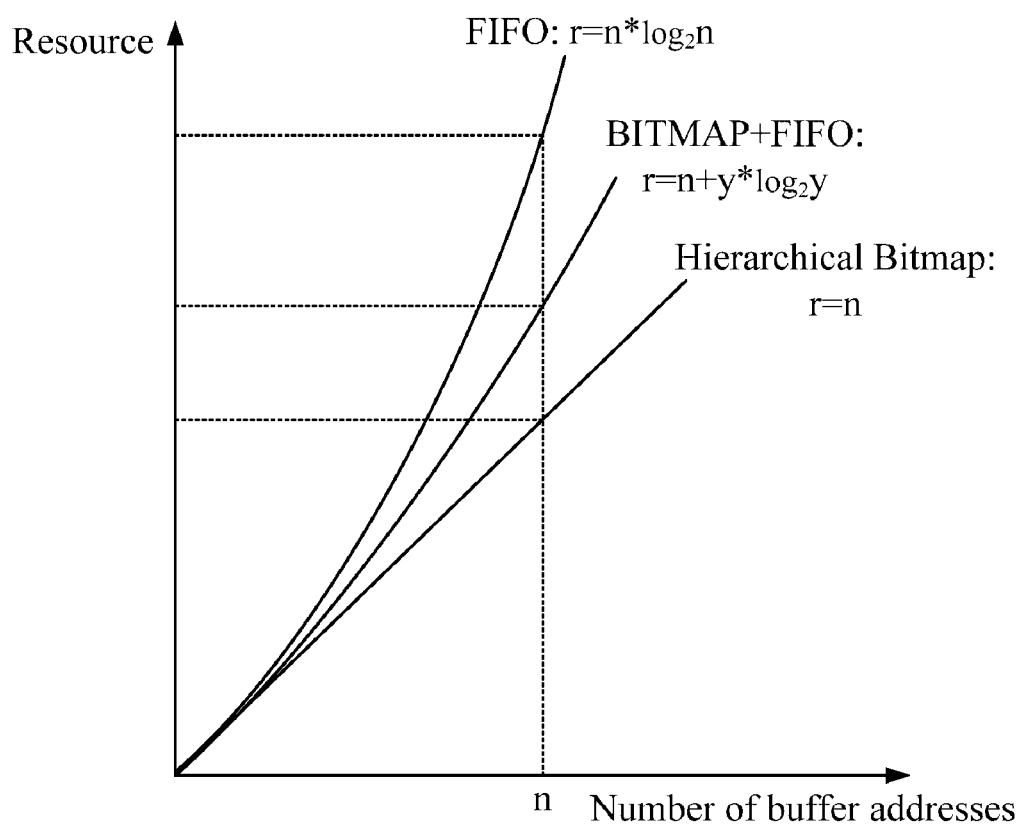
FIG. 9 shows resource consumptions of various buffer management solutions.

The method and apparatus for allocating storage addresses in embodiments of the present disclosure can control hardware resources effectively so that the memory resource consumption grows linearly with the addressing depth, and can improve the efficiency of storage address management. FIG. 9 shows resource consumption details of various buffer management solutions. As shown in FIG. 9, a storage address management solution based on a hierarchical bitmap is used to manage the buffer space, which can control the resource consumption effectively. The quantity of consumed resources is "r=n" for hierarchical bitmap solution, where n indicates the total number of buffer addresses and r indicates the quantity of consumed memory resources. In addition, the buffer management solution provided in embodiments of the present disclosure effectively improves the bandwidths for buffer release.

Although the present disclosure has been described through some exemplary embodiments, the disclosure is not limited to such embodiments. It is apparent that those skilled in the art can make various modifications and variations to the disclosure without departing from the spirit and scope of the invention. The invention is intended to cover the modifications and variations provided that they fall in the scope of protection defined by the following claims or their equivalents.

What is claimed is:

1. A method for allocating storage addresses, comprising:
receiving a request for storage address allocation;
searching a level-2 bitmap in a hierarchical bitmap in bidirectional mode, wherein the hierarchical bitmap includes N level-1 bitmaps and the level-2 bitmap, and each level-1 bitmap includes M bits, and each bit of the level-1 bitmap corresponds to a storage address and indicates the idle state of the corresponding storage address; the level-2 bitmap includes N bits corresponding to the N level-1 bitmaps, and each bit of the level-2 bitmap indicates whether the corresponding level-1 bitmap has an idle storage address; M and N are integers greater than 1;
outputting an idle bit according to the result of searching in the level-2 bitmap; and
obtaining a storage address corresponding to the output idle bit of the level-2 bitmap, and allocating the obtained storage address;
wherein the method further comprises:
searching each level-1 bitmap in bidirectional mode, and updating a corresponding bit in the level-2 bitmap according to the result of searching in the level-1 bitmap.

2. The method according to claim 1, wherein the step of updating a corresponding bit in the level-2 bitmap according to the result of searching in a level-1 bitmap comprises one of the followings:
updating a bit in the level-2 bitmap to an idle bit if the result of searching indicates that the corresponding level-1 bitmap has an idle bit; and
updating a bit in the level-2 bitmap to an occupied bit if the result of searching indicates that the corresponding level-1 bitmap does not have an idle bit.

3. The method according to claim 1, wherein the step of searching bidirectional mode search comprises:
searching a bitmap in two different directions at a time; and
determining the result of searching by selecting a result of searching in one of the two search directions according to a polling principle.

4. The method according to claim 3, wherein, if idle bits are found in both directions, the step of determining the result of searching by selecting a result of searching in of the two search directions according to a polling principle comprises:
determining, if an idle bit found in one direction is selected as the result of searching in the previous search, the result of searching in the current search by selecting an idle bit found in the other direction.

5. The method according to claim 1, wherein the step of searching in bidirectional mode comprises:
searching a bitmap in one direction at a time, wherein the search direction in the current search is different with that in the previous search; and
selecting the search result in the current search as the current bidirectional search result.

6. The method according to claim 1, wherein the result of searching in each direction is determined by the first idle bit searched out in the direction when searching in bidirectional mode.

7. The method according to claim 1, further comprising:
canceling the operation of storage address allocation at the current time when judging that the storage address obtained according to the output idle bit of the current search is the same as the storage address obtained according to the output idle bit of the previous search in the level-2 bitmap.

8. The method according to claim 1, further comprising:
reducing the value of a counter by "1" after a storage address is allocated; and
increasing the value of the counter by "1" after a storage address is released;
wherein the initial value of the counter is equal to the total number of idle addresses in the current storage space corresponding to the level-1 bitmaps.

9. The method according to claim 8, further comprising:
canceling the operation of storage address allocation at the current time when judging that the value of the counter is smaller than a preset threshold.

10. The method according to claim 1, wherein the step of obtaining a storage address corresponding to the output idle bit of the level-2 bitmap comprises:
calculating the storage address according to the position of the output idle bit in the level-2 bitmap and the position of a corresponding idle bit in the level-1 bitmap;
wherein the position of an idle bit is represented in binary notation.

11. The method according to claim 1, wherein the step of obtaining a storage address corresponding to the output idle bit of the level-2 bitmap comprises:
obtaining the storage address from a storage unit corresponding to a bit in the level-1 bitmap, wherein the storage unit is configured for storing storage address corresponding to the idle bit in the level-2 bitmap.

12. An apparatus for storage address allocation, comprising:
a first receiving chip, configured to receive a request for storage address allocation;
a first searching chip, configured to search a level-2 bitmap of a hierarchical bitmap in bidirectional mode to output an idle bit; wherein the hierarchical bitmap includes N level-1 bitmaps and the level-2 bitmap, and each level-1 bitmap includes M bits, each of which corresponds to a storage address and indicates the idle state of the corresponding storage address; and the level-2 bitmap includes N bits corresponding to the N level-1 bitmaps, and each bit of the level-2 bitmap indicates whether the corresponding level-1 bitmap has an idle storage address, where M and N are integers greater than 1; and
an allocating chip, configured to obtain a storage address according to the output idle bit of the level-2 bitmap, and allocate the obtained storage address;
a second searching chip, configured to search each level-1 bitmap in bidirectional mode, and update a corresponding bit in the level-2 bitmap according to the result of searching of a level-1 bitmap.

13. The apparatus according to claim 12, further comprising:
a first judging chip, configured to judge whether the storage address obtained according to the output idle bit of the current search is the same as the storage address obtained according to the output idle bit of the previous search in the level-2 bitmap or not, and cancel the operation of the storage address allocation at the current time if the first judging chip judges that the storage address obtained according to the output idle bit of the current search is the same as the storage address obtained according to the output idle bit of the previous search in the level-2 bitmap.

14. The apparatus according to claim 12, further comprising:
a counter, configured to store the total number of idle addresses in the current storage space corresponding to the level-1 bitmaps, wherein the value of the counter is reduced by "1" after a storage address is allocated and is increased by "1" after the storage address is released.

15. The apparatus according to claim 14, further comprising:
a second judging chip, configured to judge whether the value of the counter is smaller than a preset threshold or not, and cancel the operation of the storage address allocation at the current time if the value of the counter is smaller than the preset threshold.

16. The apparatus according to claim 12, further comprising:
a calculating chip, configured to calculate the storage address according to the position of the output idle bit in the level-2 bitmap and the position of a corresponding idle bit in the level-1 bitmap.

17. The apparatus according to claim 12, wherein:
each bit in the level-2 bitmap corresponds to a storage unit, and the storage unit is configured to store a storage address corresponding to an idle bit in the level-2 bitmap.

18. A computer-readable medium having computer usable instructions stored thereon for execution by one or more processors to perform a method comprising:
receiving a request for storage address allocation;
searching a level-2 bitmap in a hierarchical bitmap in bidirectional mode, wherein the hierarchical bitmap includes N level-1 bitmaps and the level-2 bitmap, and each level-1 bitmap includes M bits, and each bit of the level-1 bitmap corresponds to a storage address and indicates the idle state of the corresponding storage address; the level-2 bitmap includes N bits corresponding to the N level-1 bitmaps, and each bit of the level-2 bitmap indicates whether the corresponding level-1 bitmap has an idle storage address; M and N are integers greater than 1;
outputting an idle bit according to the result of searching in the level-2 bitmap;
obtaining a storage address corresponding to the output idle bit of the level-2 bitmap, and allocating the obtained storage address;
searching each level-1 bitmap in bidirectional mode; and
updating a corresponding bit in the level-2 bitmap according to the result of searching in the level-1 bitmap.

* * * * *